(12) United States Patent
Kajiwara

(10) Patent No.: US 7,626,928 B2
(45) Date of Patent: Dec. 1, 2009

(54) COMMUNICATION APPARATUS, COMMUNICATION PROGRAM, STORAGE MEDIUM, AND METHOD OF COMMUNICATION

(75) Inventor: Tomohito Kajiwara, Higashi-Murayama (JP)

(73) Assignee: Ricoh Company, Ltd., Tokyo (JP)

( * ) Notice: Subject to any disclaimer, the term of this patent is extended or adjusted under 35 U.S.C. 154(b) by 600 days.

(21) Appl. No.: 11/081,600

(22) Filed: Mar. 17, 2005

(65) Prior Publication Data
US 2005/0213569 A1 Sep. 29, 2005

(30) Foreign Application Priority Data
Mar. 17, 2004 (JP) ............................. 2004-076031

(51) Int. Cl.
*H04L 1/00* (2006.01)
(52) U.S. Cl. ...................... 370/230; 370/231; 709/238; 709/245
(58) Field of Classification Search .................. None
See application file for complete search history.

(56) References Cited

U.S. PATENT DOCUMENTS

| | | | |
|---|---|---|---|
| 6,625,169 B1* | 9/2003 | Tofano ......................... | 370/466 |
| 2003/0023748 A1* | 1/2003 | Takemoto et al. ............ | 709/238 |
| 2003/0103243 A1* | 6/2003 | Watanabe et al. ............ | 358/405 |
| 2005/0108551 A1* | 5/2005 | Toomey ....................... | 713/185 |
| 2005/0281198 A1* | 12/2005 | Miyamoto et al. ........... | 370/235 |
| 2008/0001765 A1* | 1/2008 | Nguyen et al. ............... | 340/588 |

FOREIGN PATENT DOCUMENTS

| | | |
|---|---|---|
| JP | 1-158842 | 6/1989 |
| JP | 2001-111580 | 4/2001 |
| JP | 2001-197249 | 7/2001 |
| JP | 2001-309112 | 11/2001 |

OTHER PUBLICATIONS

Patent Abstracts of Korea, KR 1020030034013 A, May 1, 2003.
U.S. Appl. No. 11/282,654, filed Nov. 21, 2005, Kajiwara.

* cited by examiner

*Primary Examiner*—Jayanti K Patel
*Assistant Examiner*—Anthony Sol
(74) *Attorney, Agent, or Firm*—Oblon, Spivak, McClelland, Maier & Neustadt, L.L.P.

(57) ABSTRACT

A communication apparatus connected to a plurality of IP (internet protocol) networks and conducting packet communication with other communication apparatuses through the plurality of IP networks includes a memory and a controller. The controller conducts the packet communication with the other communication apparatuses and controls bandwidth speeds used by the packet communication with other communication apparatuses according to addressee information of the other communication apparatuses stored in the memory. The memory includes a data-table which registers and correlates the addressee information and corresponding bandwidth speeds of the other communication apparatuses. The controller controls the bandwidth speeds for the other communication apparatuses by referring to the data-table by using the addressee information of the other communication apparatuses. The addressee information of the other communication apparatuses include IP addresses, subnet-addresses of the IP addresses, and alias information of the other communication apparatuses.

24 Claims, 9 Drawing Sheets

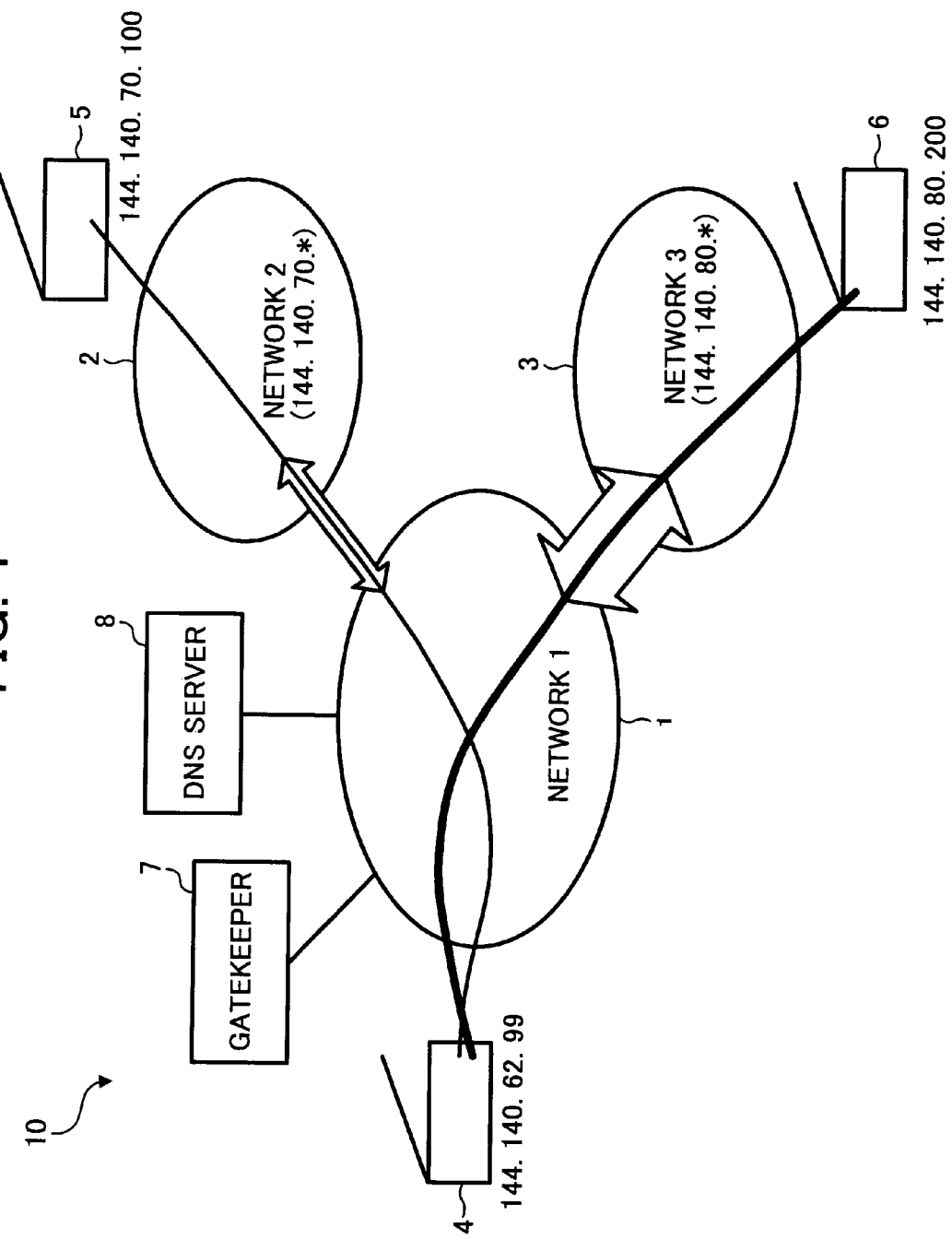

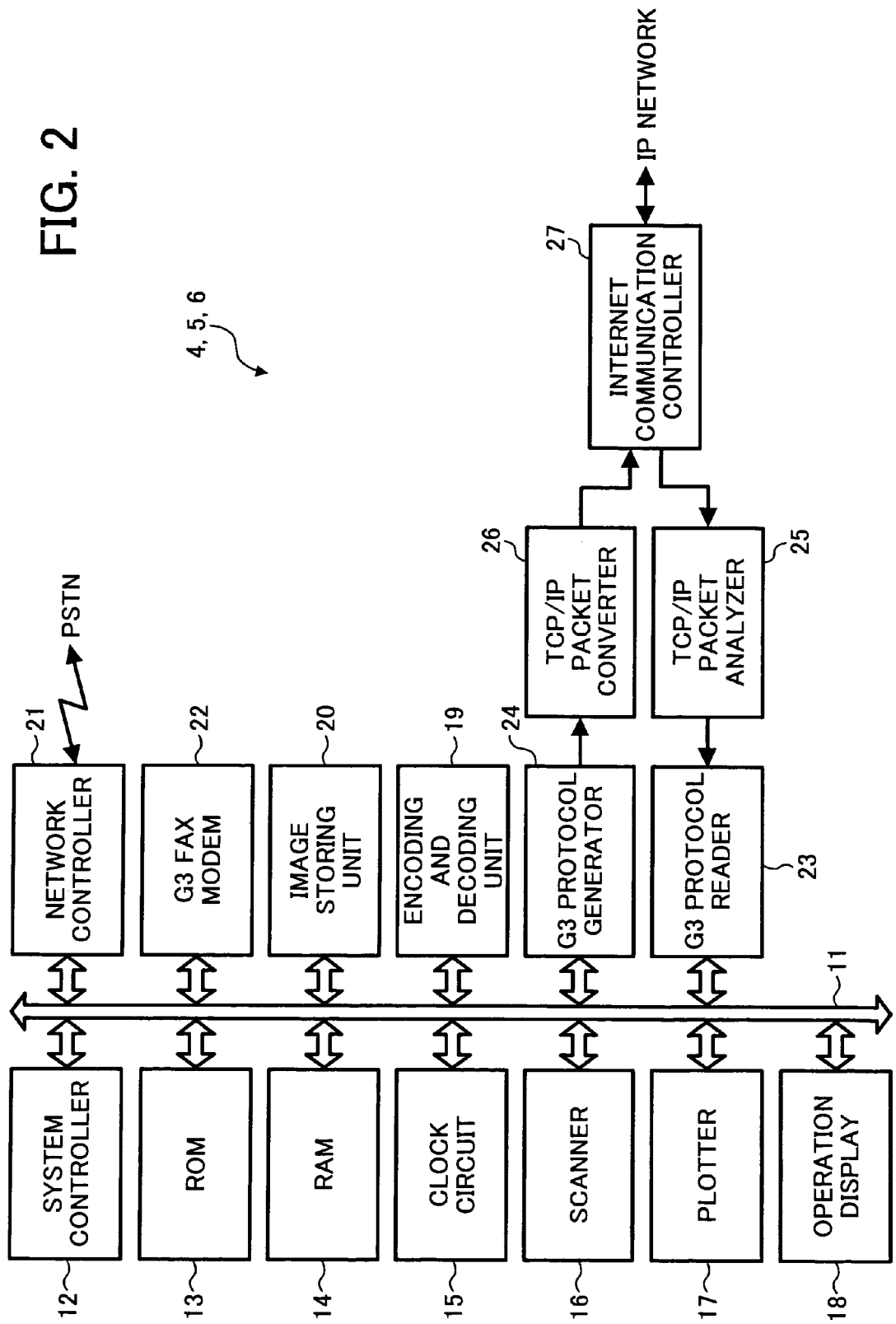

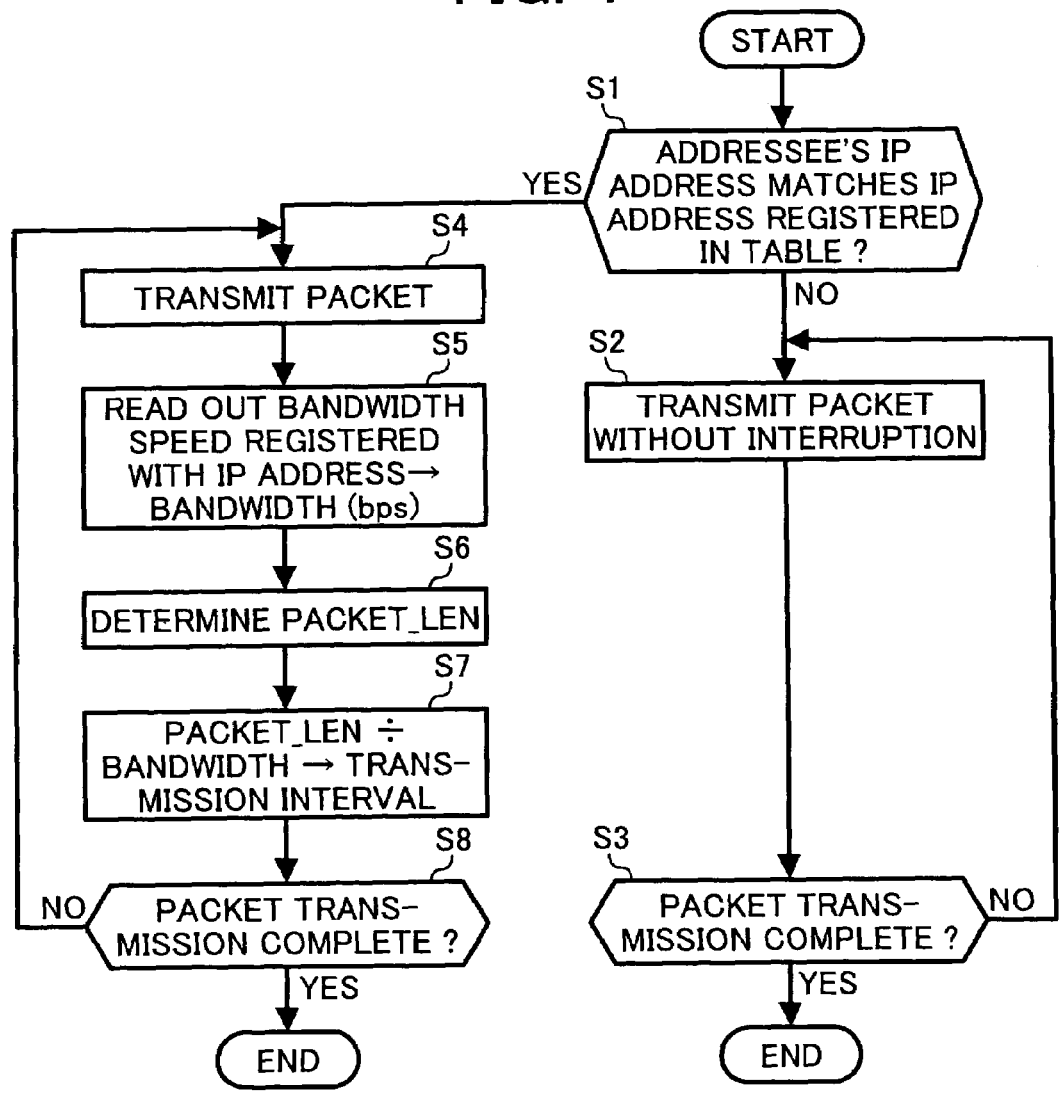

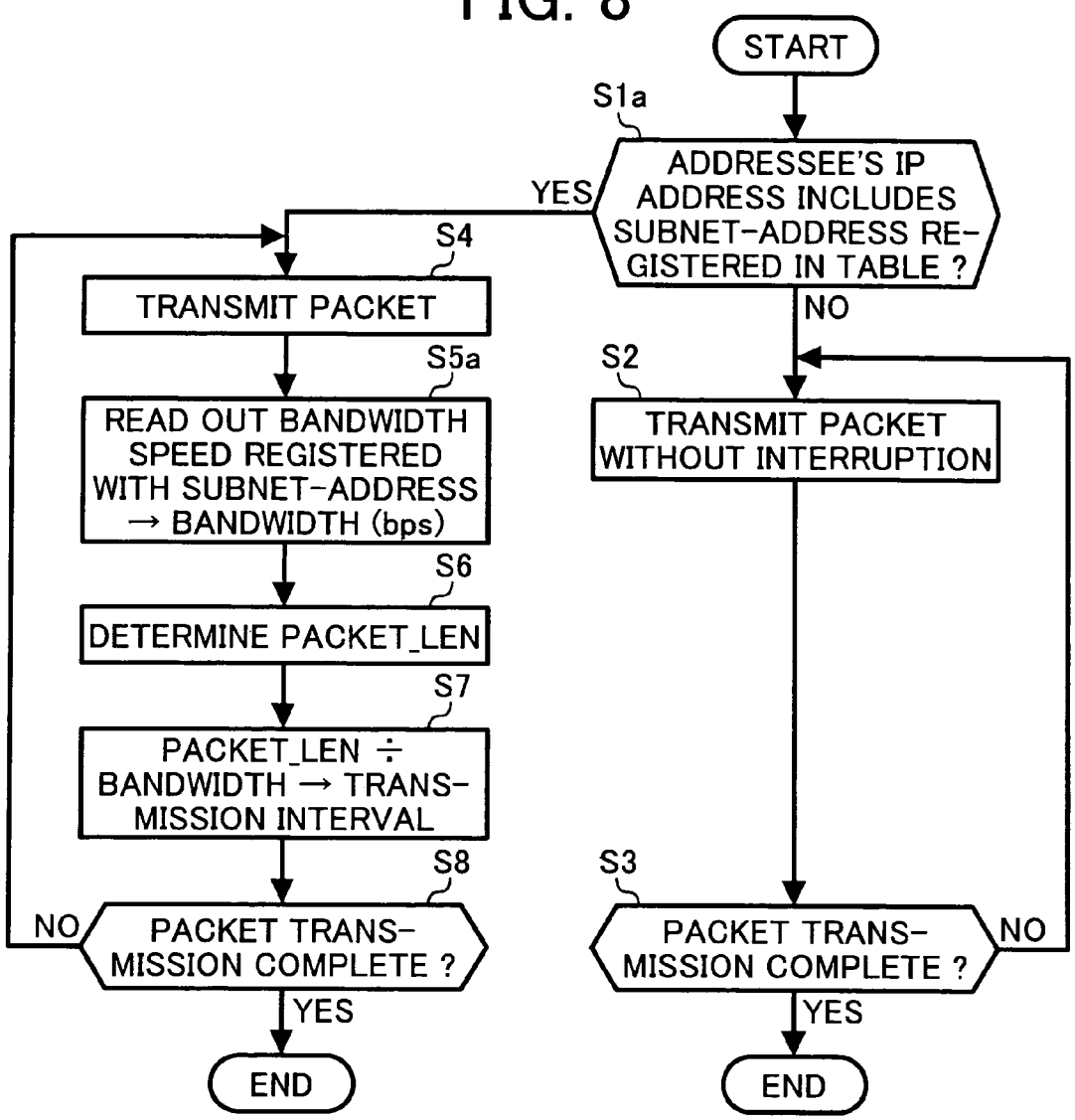

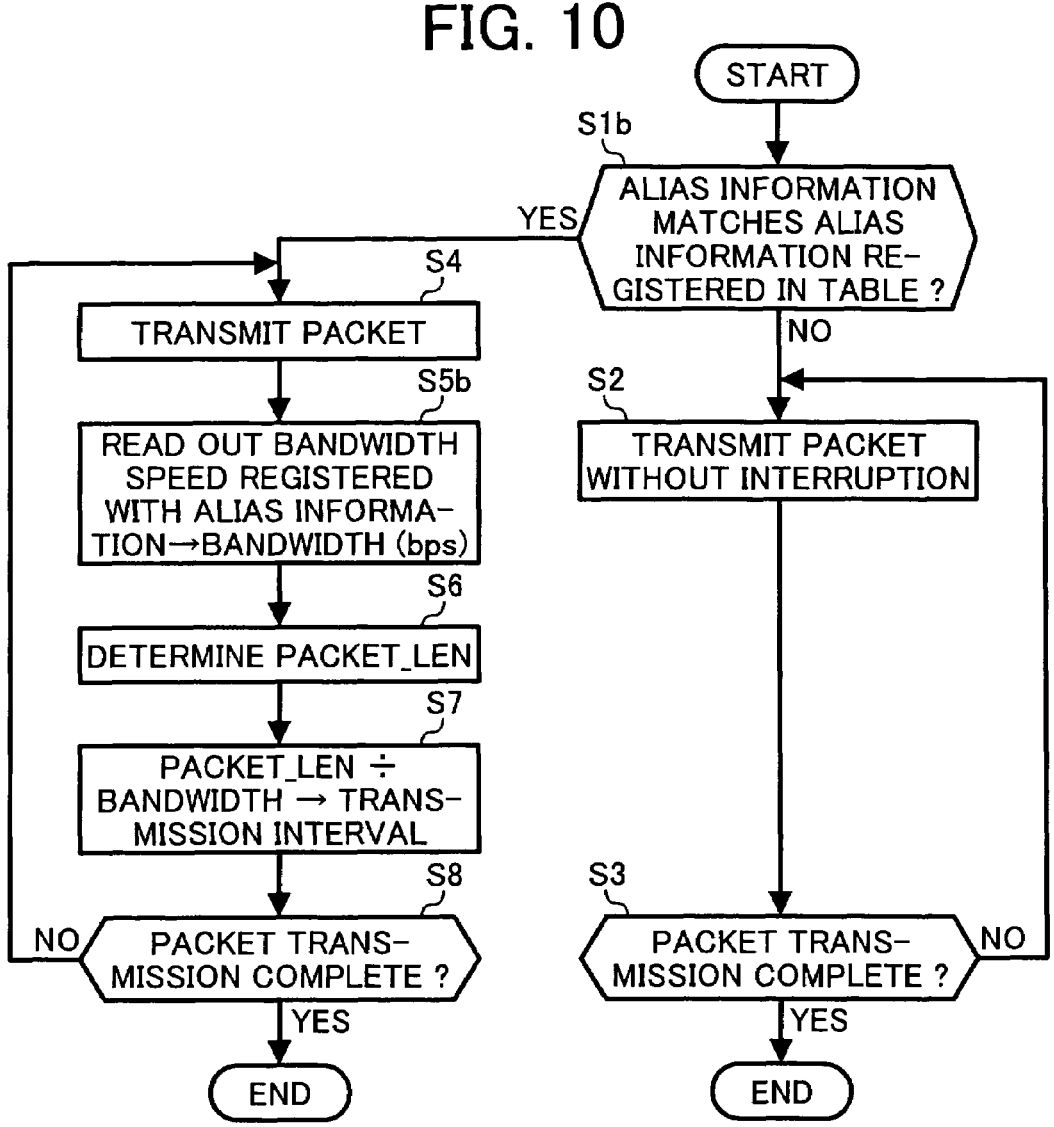

COMMUNICATION APPARATUS, COMMUNICATION PROGRAM, STORAGE MEDIUM, AND METHOD OF COMMUNICATION

BACKGROUND OF THE INVENTION

1. Field of the Invention

The present invention relates to a communication apparatus, such as a facsimile, connected to an IP (internet protocol) network and configured to conduct communication via the Internet. The invention also relates to a corresponding communication program installed in a computer of the communication apparatus, and a storage medium for communication program and a communication method.

2. Discussion of the Background

Recently, an increased number of communication apparatuses used in corporations and homes have been connected to broad bandwidth networks. For example, a real-time facsimile communication system adapted to IP (internet protocol) networks using packet switching for data transmission has become increasingly popular.

Such IP network systems may configure a single communication network that has both broad and narrow bandwidth capabilities. The narrow bandwidth portion may include an ISDN (integrated services digital network), for example.

In another case, such an IP network system may include an ADSL (asymmetric digital subscriber line) in which the line operates at two different speeds, allowing information to be downloaded more quickly than it is uploaded.

When a large amount of packets are transmitted in such a network, the broad bandwidth line may be able to support transmissions without any problems while transmission problems such as packet loss, packet delay, transmission-impossible may occur in the corresponding narrow bandwidth line.

This scenario leads to potential inefficiencies, particularly when low bandwidth devices are out-of-service while high bandwidth service is available.

Thus, what is desired, as discovered by the present inventors, is a method, apparatus and computer program product that will enable more efficient use of telecommunications services. In particular, what is desired is a method, apparatus and computer program product that will enable IP telephone users to continue to operate despite a disruption of conversations on narrow bandwidth lines.

SUMMARY OF THE INVENTION

A communication apparatus connected to a plurality of IP (internet protocol) networks and conducting packet communication with other communication apparatuses through the plurality of IP networks includes a memory and a controller. The controller conducts the packet communication with the other communication apparatuses and controls bandwidth speeds used by the packet communication with other communication apparatuses according to addressee information of the other communication apparatuses stored in the memory. The memory includes a data-table which registers and correlates the addressee information and corresponding bandwidth speeds of the other communication apparatuses. The controller controls the bandwidth speeds for the other communication apparatuses by referring to the data-table by using the addressee information of the other communication apparatuses. The addressee information of the other communication apparatuses include IP addresses, subnet-addresses of the IP addresses, and alias information of the other communication apparatuses.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an exemplary schematic network system coupling a plurality of communication apparatuses according to an exemplary embodiment of the present invention;

FIG. 2 is an exemplary block diagram of a communication apparatus such as facsimile according to an exemplary embodiment of the present invention;

FIG. 3 is an exemplary data-table registering IP addresses and bandwidth speeds according to an exemplary embodiment of the present invention;

FIG. 4 is an exemplary flow chart explaining a control operation for a packet transmission according to an exemplary embodiment of the present invention;

FIG. 8 is another exemplary flow chart explaining a control operation for a packet transmission according to an exemplary embodiment of the present invention;

FIG. 9 is an exemplary data-table registering alias information and bandwidth speeds according to an exemplary embodiment of the present invention;

FIG. 10 is another exemplary flow chart explaining a control operation for a packet transmission according to an exemplary embodiment of the present invention;

FIG. 11 is an exemplary data-table registering a plurality of addressee's types and bandwidth speeds according to an exemplary embodiment of the present invention;

DETAILED DESCRIPTION OF THE PREFERRED EMBODIMENTS

Figure 5A:
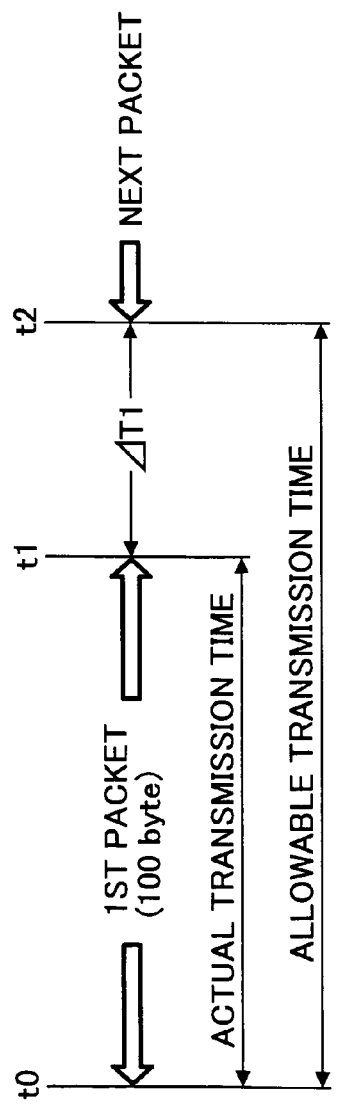
FIG. 5 is an exemplary timing chart explaining a control operation for a packet transmission according to an exemplary embodiment of the present invention.

In describing preferred embodiments illustrated in the drawings, specific terminology is employed for the sake of clarity. However, the disclosure of the present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1 thereof, an exemplary configuration of a network system coupling a plurality of communication apparatuses according to an exemplary embodiment of the present invention is described.

FIG. 1 shows an exemplary configuration of a network system adapted to an IP (internet protocol) network using TCP/IP (transmission control protocol/internet protocol) and packet switching for data transmission.

As illustrated in FIG. 1, a network system 10 includes three IP networks 1, 2, and 3 having respective bandwidths and connected to each other, real-time communication apparatuses 4, 5, and 6, a gatekeeper 7, a DNS (domain name system) server 8.

The real-time communication apparatuses 4, 5, and 6 such as facsimile are connected to the IP networks 1 and 2, and 3, respectively. The gatekeeper 7 and the DNS server 8 functioning as an IP address resolution server are connected to the IP network 1. The facsimiles 4, 5, and 6 can communicate with each other via the IP networks 1, 2, and 3, and also can communicate with the gatekeeper 7 and the DNS server 8 in a real-time manner.

The facsimiles 4, 5, and 6 can communicate image information with a G3 fax (Group 3 fax) having a G3 facsimile terminal (not shown) via the IP networks 1, 2, and 3, a gateway (not shown), and a public switched telephone network (not shown).

The facsimiles 4, 5, and 6 can also communicate with a not-shown Internet Aware Fax (IAF), having a similar function of the facsimiles 4, 5, and 6, via the IP networks 1, 2, and 3 by conducting the ITU-T (International Telecommunication Union Telecommunication Standardization Sector) Recommendation T.38.

FIG. 2 shows an exemplary hardware configuration in a communication apparatus such as facsimile 4. The facsimiles 4, 5, and 6 employ a similar configuration one another.

As illustrated in FIG. 2, the facsimile 4 includes an internal bus 11, a system controller 12, a ROM (read only memory) 13, a RAM (random access memory) 14, a clock circuit 15, a scanner 16, a plotter 17, an operation display 18, an encoding and decoding unit 19, an image storing unit 20, a network controller 21, a G3 fax modem 22, a G3 protocol reader 23, and a G3 protocol generator 24, all of which are coupled to the internal bus 11.

The G3 protocol reader 23 is coupled to an internet communication controller 27 via a TCP/IP (transmission control protocol/internet protocol) packet analyzer 25, and the G3 protocol generator 24 is coupled to the internet communication controller 27 via a TCP/IP packet converter 26.

The system controller 12 includes a CPU (central processing unit) to run at least one control program installed in the ROM 13, and controls the above-mentioned each section of the communication apparatus using the RAM 14 as a working memory area.

As above-mentioned, the ROM 13 stores the at least one control program used for the system controller 12 to control the above-mentioned each section of the communication apparatus.

The ROM 13 can store a plurality of programs such as operating system program, communication program, and a variety of data or system data required to run the operating system program and communication program.

Accordingly, the ROM 13 stores at least one communication program to execute a plurality of functions to be described later. Therefore, the ROM 13 serves as a storage medium or computer-readable medium for storing communication programs.

The ROM 13 can include an EEPROM (electrically erasable programmable read-only memory) or a flash memory so that the communication programs stored in the ROM 13 are re-writable.

Although not shown in FIG. 2, the communication apparatus can include a network interface so that the communication apparatus can download at least one program via at least one network.

The system controller 12 uses the RAM 14 as a working memory area. The RAM 14 stores addressee information such as addressee's telephone numbers including one-touch operation dial or abbreviated dialing, and names of addressees. The RAM 14 functioning as a storage device also includes a data-table registering addressee information and bandwidth speed, which is described later. The RAM 14 is backed up by a back-up circuit (not shown) to retain memory contents in the RAM 14 even if the communication apparatus is shutdown from a power source.

The scanner 16 scans a document image with a predetermined resolution. The plotter 17 plots an image with a predetermined resolution. The operation display 18, provided with at least one operational key and at least one display unit, is used to operate the facsimile 4. The encoding and decoding unit 19 encodes and compresses original image signals to image data, and decodes the image data to the original image signals. The image storing unit 20, functioning as an image data memory, stores a plurality of encoded and compressed image data.

The network controller 21, provided with an automatic calling function and automatic receiving function, couples the facsimile 4 to a PSTN (public switched telephone network). The G3 fax modem 22, provided with a low-speed and high-speed modem functions, serves as a modem for the G3 facsimile. The internet communication controller 27 couples the facsimile 4 to the IP network 1 so that the facsimile 4 and the IP network 1 can transmit data each other in accordance with communication protocols defined by the ITU-T Recommendation T.38.

The TCP/IP packet analyzer 25 receives TCP/IP packets via the internet communication controller 27 and analyzes the received TCP/IP packets. Then, the TCP/IP packet analyzer 25 transmits the analyzed information to the G3 protocol reader 23. The G3 protocol reader 23 receives the packet information from the TCP/IP packet analyzer 25, and takes out G3 facsimile transmission control procedure from the packet information in a real-time transmission procedure. The G3 protocol generator 24 converts the G3 facsimile transmission control procedure to G3 facsimile transmission procedure signals in a real-time transmission procedure, and transmits the G3 facsimile transmission procedure signals to the TCP/IP packet converter 26.

The TCP/IP packet converter 26 receives the G3 facsimile transmission procedure signals from the G3 protocol generator 24, and converts the G3 facsimile transmission procedure signals to TCP/IP packets. Then, the TCP/IP packet converter 26 transmits the TCP/IP packets to the internet communication controller 27.

The gatekeeper 7 connected to the IP network 1 is one component complying the ITU-T Recommendation H.323. More specifically, the gatekeeper 7 is capable of multimedia communication compliant with the ITU-T Recommendation H.323 version 2. That is, the ITU-T Recommendation H.323 terminals provided to the facsimiles 4, 5, and 6 assume an environment where the gatekeeper 7 is provided on each of the IP networks 1, 2, and 3. Such terminals communicate with the gatekeeper 7 using RAS (registration, admission and status) message.

The gatekeeper 7 on the IP network 1 registers "alias information" including non-IP address information such as fax number, MAC (media access control) address, e-mail address while correlating such information to a specific IP address. In such a way, a specific alias information becomes a key word to search a specific IP address. When the gatekeeper 7 receives alias information as addressee information, the gatekeeper 7 conducts an address conversion, in which specific alias information is converted to a corresponding specific IP address, and conducts an access control on the network, for example.

The DNS server 8 has a substantially similar function as the facsimiles 4, 5, and 6 except that the DNS server 8 does not scan document images and output printouts. In other words, the DNS server 8 is not provided with a scanner and a plotter. The DNS server 8 conducts an address conversion as in the gatekeeper 7, that is the DNS server 8 receives a domain name (e.g., host name) and converts the domain name to an IP address. The DNS server 8 includes a data-table (not shown), in which IP addresses for the IP networks 1, 2, and 3 are correlated to domain names (e.g., host names), which is one kind of alias information.

FIG. 1 shows an exemplary network system configuring the above-described components. The facsimile 4 has an IP address of 144.140.62.99, for example. The facsimile 5 has an IP address of 144.140.70.100, for example, because the facsimile belongs to the IP network 2 having an IP address 144.140.70.* (i.e., subnet-address). The facsimile 6 has an IP address of 144.140.80.200, for example, because the facsimile 6 belongs to the IP network 3 having an IP address 144.140.80.* (i.e., subnet-address).

In an exemplary embodiment illustrated in FIG. 1, the IP networks 1 and 3 communicate with each other via a broad bandwidth, in which signals can be communicated sufficiently at a bandwidth speed of 14.4 Kbps, for example. On one hand, the IP networks 1 and 2 communicate with each other via a narrow bandwidth, in which signals can be communicated sufficiently at a bandwidth speed of 6.4 kbps, for example, but signals cannot be communicated sufficiently at a bandwidth speed of 14.4 Kbps. Furthermore, the IP network 1 can communicate with other IP network (not shown) at a bandwidth speed of 3.2 Kbps, for example. The RAM 14 of the facsimile 4 has a data-table 31, which has correlated and registered addressee information and corresponding bandwidth speed, as illustrated in FIG. 3.

In case of the data-table 31 of FIG. 3, addressee information include 1P addresses, and the bandwidth speed suitable for communication with such addressee information is registered.

As described above, the facsimile 6 and the networks 1 and 3 can communicate each other via a broadband width, thus the facsimile 6 does not need a consideration for bandwidth speed when conducting a packet transmission. Therefore, the data-table 31 does not register the addressee information (i.e., IP address) of the facsimile 6.

On the other hand, the data-table 31 registers addressee information (i.e., IP address) and the corresponding bandwidth speed of the facsimile 5 and the other facsimile (not shown) because the facsimile 5 and the other facsimile (not shown) need to select a bandwidth speed suitable for packet transmission when conducting a packet transmission. With such configuration, the facsimile 4 communicates (i.e., conducts packet transmission) with a predetermined addressee facsimile using the IP network and the data-table 31.

In this case, the system controller 12 conducts a control operation, which is explained with a flow chart in FIG. 4. As shown in FIG. 4, the communication starts with an input of addressee's IP address. In Step S1, a CPU (central processing unit) in the system controller 12 judges whether the input addressee's IP address matches with any IP addresses registered in the data-table 31. For example, if the input IP address is "144.140.80.200," the CPU judges that the "144.140.80.200" does not exist in the data-table 31 because the "144.140.80.200" is not registered in the data-table 31.

Then, in Step S2, packets are transmitted without any interruption during packet transmission. In Step S3, the CPU judges whether the all packets transmission completes. When the CPU judges that the all packets transmission is completed, the CPU finishes the packets transmission. Specifically, packets are transmitted from the facsimile 4 to the facsimile 6 with a relatively fast bandwidth speed of 14.4 Kbps, for example. On one hand, in Step S1, if the input IP address is "144.140.70.100," for example, the CPU judges that the "144.140.70.100" exists in the data-table 31 because the "144.140.70.100" is registered in the data-table 31 as illustrated in FIG. 3.

In Step S4, a first packet is transmitted to the facsimile 5 having the IP address of 144.140.70.100. In Step S5, the CPU reads out a bandwidth speed of 6.4 kbps, registered in the data-table 31 with the corresponding IP address, from the data-table 31, and sets the bandwidth speed as "BANDWIDTH SPEED (bps)." In Step S6, the CPU determines a packet length of "PACKET_LEN" for one transmission.

Generally, it is better to transmit a longer packet per one transmission to conduct an efficient transmission because a longer packet reduces a number of headers. However, if one packet becomes significantly longer, it will affect other communications because such packet occupies a network with a longer time. Therefore, in this exemplary case, a user can choose a packet length by checking a crowded level on the network. For example, a user can select a packet length by operating selection buttons or the like of a facsimile apparatus.

In Step S7, the CPU computes determine a packet transmission interval time as below. The CPU computes "PACKET_LEN÷BANDWIDTH SPEED" to gain "allowable transmission time." Then, the CPU computes "allowable transmission time−actual transmission time" to determine a packet transmission interval time, wherein the actual transmission time is explained later with reference to FIG. 5.

In Step S8, the CPU judges whether the all packets transmission using the bandwidth speed registered in the data-table 31 is completed. If the CPU judges that the all packets transmission is not completed, the process goes back to Step S4, and a next packet is transmitted after interposing a packet transmission interval time.

The CPU repeats Steps S4 to S7 until the all packets transmission completes. Accordingly, a packet transmission interval time is calculated through Steps S1, S4 to S7, and S8 for each time after transmitting a packet. Therefore, when the facsimile 4 conducts a facsimile transmission to the facsimile 5 through a narrow bandwidth, the CPU refers to the data-table 31 to search a bandwidth speed corresponding to a called IP address of the facsimile 5 to conduct a successful packet transmission from the facsimile 4 to the facsimile 5. In such a way, a bandwidth speed corresponding to a called IP address is selected from the data-table 31 so that a packet transmission can be conducted successfully. In this way, communication problems such as packet loss, packet delay, transmission-impossible can be prevented, thus adverse effects to other communications can be also prevented.

As discussed above, a bandwidth speed is selected by referring bandwidth speeds registered in the data-table 31, and packets are transmitted using such selected bandwidth speed.

Figure 5B:
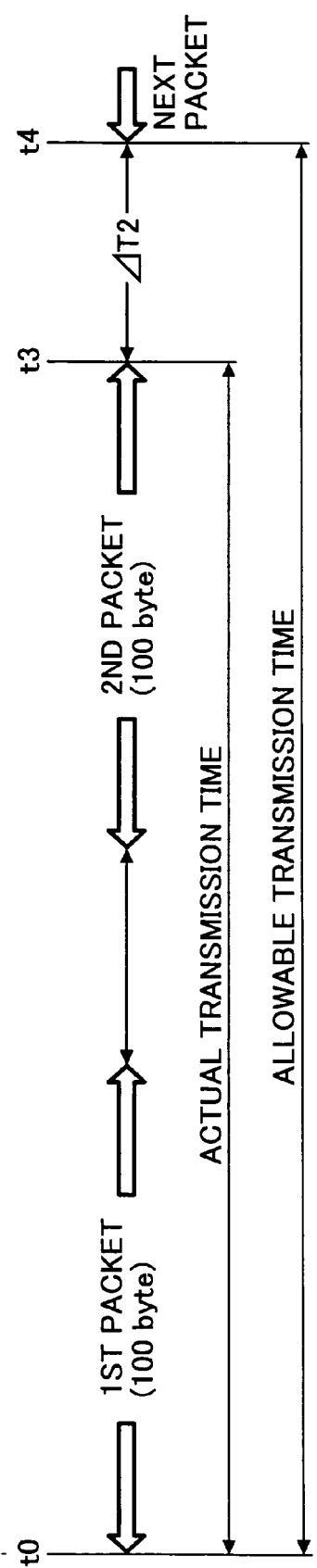

FIGS. 5A and 5B show an exemplary control method for a packet transmission using a specific bandwidth speed registered in the data-table 31. In FIGS. 5A and 5B, the size of each packet is set to 100 bytes, for example.

FIG. 5A shows a case when a first packet (100 bytes) is transmitted. As illustrated in FIG. 5A, record a time "t0" marking a transmission start of the first packet (100 bytes). Next, record a time "t1" marking a transmission completion of the first packet (100 bytes). Then, an actual transmission time of the first packet (100 bytes) can be calculated by "t1−t0." The CPU also calculates an allowable transmission time "t2" for transmitting the first packet (100 bytes) with a designated bandwidth speed, wherein the "allowable transmission time "t2" is a maximally allowed transmission time for the first packet transmission, which is gained by calculating a formula of "first packet length÷bandwidth speed."

To synchronize a transmission timing of the first packet with a transmission timing of the facsimile, a difference "ΔT1", calculated by subtracting the time "t1" (typically, a significantly shorter time) from the time "t2", is interposed as a packet transmission interval time after the time "t1". The CPU sets the packet transmission interval time with a task of "sleep" function, and a next packet (i.e., second packet) is transmitted after the time "t1" plus "ΔT1."

FIG. 5B shows a case when a second packet (100 bytes) is transmitted. As illustrated in FIGS. 5A and 5B, the time "t0" marking a transmission start of the first packet (100 bytes) is used as a reference start time for the second packet transmission. As illustrated in FIG. 5A, record a time "t3" marking a transmission completion of the second packet (100 bytes). Then, an actual transmission time of the first and second packets (i.e., a total of 200 bytes) can be calculated by a formula of "t3−t0."

The CPU also calculates an allowable transmission time "t4" for transmitting the first and second packets (i.e., a total of 200 bytes) with a designated bandwidth speed, wherein the allowable transmission time "t4" is a maximally allowed transmission time for the first and second packets transmission, which is gained by calculating a formula of "(first packet length+second packet length)÷bandwidth speed."

To synchronize a transmission timing of the second packet with a transmission timing of the facsimile, a difference "ΔT2", calculated by subtracting the time "t3" from the "t4", is interposed as a packet transmission interval time after the time "t3." The CPU sets the packet transmission interval time with a task of "sleep" function, and a next packet (i.e., third packet) is transmitted after the time "t3" plus "ΔT2."

As described above, the CPU calculates a packet transmission interval time by using the time "t0" as the reference start time for each packet transmission. Similar processes are repeated for a third packet, a fourth packet and so on, and the above-described processes can be summarized as below.

Obtain "an accumulated packet length" by adding each packet length from the first packet to the n-th packet (n is a natural number of two or more).

Divide the "accumulated packet length" by a designated bandwidth speed to obtain an allowable transmission time "tn", wherein the allowable transmission time "tn" is maximally allowed transmission time for the "accumulated packet."

Determine an actual transmission time "ta" required to transmit all packets (i.e., from first packet to the n-th packet) by measuring the first packet transmission start time and the n-th packet transmission completion time.

Calculate a time difference "ΔTn" between the allowable transmission time "tn" and the actual transmission time "ta" with a formula of "tn−ta."

Then, synchronize a transmission timing of the (n+1)-th packet with a transmission timing of the facsimile by setting the time difference "ΔTn" with a task "sleep" function.

Figures 6, 7:
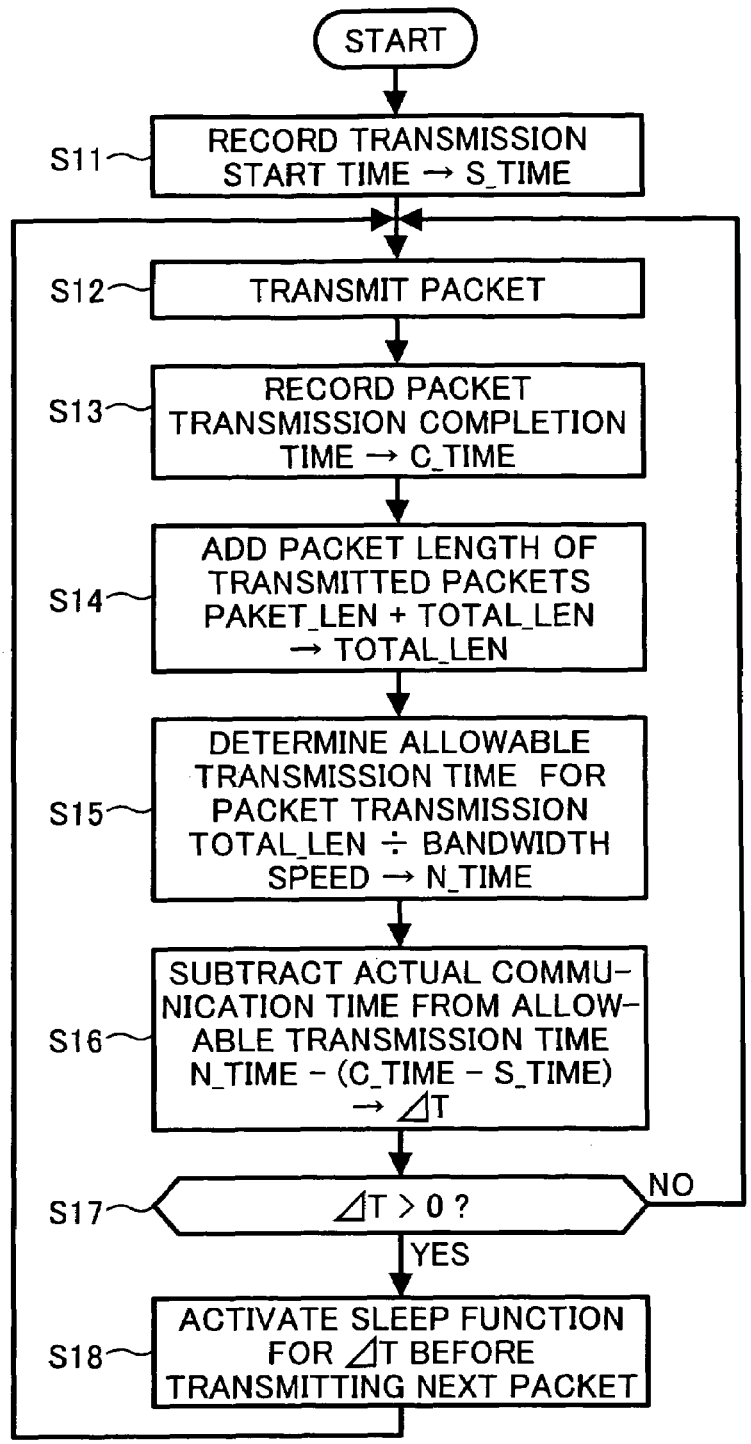
FIG. 6 is an exemplary flow chart explaining the control operation in FIG. 5.
FIG. 7 is an exemplary data-table registering subnet-addresses of IP addresses and bandwidth speeds according to an exemplary embodiment of the present invention.

FIG. 6 is an exemplary flow chart explaining the above-described processes for packet synchronization. In Step S11, the CPU records a transmission start time as "S_Time." In Step S12, a first packet is transmitted. In Step S13, the CPU records a first packet transmission completion time as "C_Time." In Step S14, the CPU calculates a total packet length by adding (i.e., accumulating) packet length of each transmitted packet.

In Step S15, the CPU calculates an allowable transmission time by dividing the total packet length with a designated bandwidth speed. In Step S16, the CPU calculates a time difference ΔT by subtracting an actual transmission time from the allowable transmission time. In Step S17, the CPU judges whether the time difference ΔT is zero.

If the CPU judges that the ΔT is zero, a packet transmission is continued without interruption. If the CPU judges that the ΔT is more than zero, in Step S18, the CPU activates a sleep function for a time corresponding the ΔT before transmitting a next packet. It can be assumed that there is a case that the ΔT becomes less than zero due to some reasons such as activation of copying function while conducting facsimile transmission on an IP network. In such a case, a packet is transmitted without interposing a packet transmission interval.

As for the packet transmission control, a packet transmission interval time (i.e., sleep time) can be determined for each single packet (e.g., first packet, second packet, third packet, and so on) basis. However, in such packet transmission control, an error may happen to the packet transmission interval time (i.e., sleep time) because the packet transmission interval time (i.e., sleep time) may be affected by some conditions (e.g., busy status) of a transmission side apparatus. On the other hand, as for the packet transmission control according to an exemplary embodiment of the present invention, the CPU calculates a total packet length by accumulating packet length of all transmitted packets.

Then, the CPU compares an allowable transmission time for the accumulated total packet length with an actual transmission time, wherein the allowable transmission time is calculated by dividing the accumulated packet length with a bandwidth speed designated by referring a data-table registering bandwidth speeds. Then, the CPU obtains a packet transmission interval time gained by subtracting the actual transmission time from the allowable transmission time.

With such adjustment, the CPU can control the packet transmission so that the packet transmission can be less likely disturbed by an error, and can transmit packets by synchronizing the packet with an allowable transmission time for a specific bandwidth speed.

FIGS. 5A and 5B show an example that the packet transmission is conducted with a packet size of 100 bytes, however, the packet transmission can be conducted with a packet size of any bytes in packet transmission. For example, a packet size of 200 bytes can be used in packet transmission.

Each packet inherently includes a header at a first top portion of the packet. Therefore, a reduction of number of headers is effective to improve packet transmission efficiency. Specifically, each packet length is preferably set to a same length, and preferably set to a size that can reduce a number of headers in packet transmission. Such packet length is obtained by multiplying one block size (e.g., 256 bytes) of ECM (error correction mode) with a whole number while satisfying a size smaller than 600 bytes defined by the UDP (user datagram protocol) standard, for example. In such an example, the packet length of 512 bytes is obtained, for example, by multiplying one block size (e.g., 256 bytes) of ECM with a whole number of "2". By setting the packet size as described above, the number of headers in packet transmission can be preferably reduced.

The data-table 31 illustrated in FIG. 3 does not register addressee information of a terminal apparatus that does not require a modification of its bandwidth speed (e.g., addressee information of the facsimile 6). However, the data-table 31 can register the addressee information of the facsimile 6 such as IP address and bandwidth speed, for example. In such a case, Step S1 in FIG. 4 can be changed to a process that the CPU judges whether a bandwidth speed, registered in the data-table 31, can be used for packet transmission without any modification of the bandwidth speed.

FIG. 7 shows another data-table 32, which registers addressee information in a different manner with respect to the data-table 31. In the data-table 32, addressee information is not identified by an IP address of each terminal apparatus, but identified by a subnet-address included in the IP address for each terminal apparatus.

The subnet-address is a group address which is part of the IP address, wherein a plurality terminal apparatuses shares the top three portion of the same IP address, for example, as indicated by the data-table 32. Accordingly, addressee information for the each terminal apparatus is identified as a group-basis (i.e. network-basis) with the subnet-address for each network such as network 2.

The facsimile 4 communicates (i.e., conducts packet transmission) with a predetermined addressee facsimile using the IP network and the data-table 32. In this case, the system controller 12 conducts a control operation, which is explained with a flow chart in FIG. 8.

As illustrated in FIG. 8, a facsimile communication starts with an input of addressee's IP address. In Step S1a, the CPU judges whether the input addressee's IP address includes any subnet-addresses registered in the data-table 32. For example, if the input IP address is "144.140.80.200," the CPU judges that the "144.140.80.200" does not exist in the data-table 32 because the 144.140.80.200" is not registered in the data-table 32. Then, in Step S2, packets are transmitted without any interruption during packet transmission.

In Step S3, the CPU judges whether the all packets transmission completes. When the CPU judges that the all packets transmission is completed, the CPU finishes the packets transmission. Specifically, packets are transmitted from the facsimile 4 to the facsimile 6 with a relatively fast bandwidth speed of 14.4 Kbps, for example. On one hand, in Step S1a, if the input IP address is "144.140.70.100," for example, the CPU judges that the "144.140.70.100" exists in the data-table 32 because the 144.140.70.*" is registered in the data-table 32. Then, in Step S4, a first packet is transmitted to the facsimile 5.

In Step S5a, the CPU reads out a bandwidth speed of 6.4 kbps, registered with the corresponding subnet-address in the data-table 32, and sets the bandwidth speed as "BANDWIDTH" (bps). In Step S6, the CPU determines a packet length "PACKET_LEN" for one transmission. Generally, it is better to transmit a longer packet per one transmission to conduct an efficient transmission because a longer packet reduces a number of headers. However, if one packet becomes significantly longer, it will affect other communications because such packet occupies a network with a longer time. Therefore, in this exemplary case, a user can choose a packet length by checking a crowded level on the network. For example, a user can select a packet length by operating selection buttons or the like of a facsimile apparatus.

In Step S7, the CPU computes a packet transmission interval time as below. The CPU computes "PACKET_LEN÷BANDWIDTH SPEED" to gain "allowable transmission time." Then, the CPU computes "allowable transmission time−actual transmission time" to determine a packet transmission interval time.

In Step S8, the CPU judges whether the all packets transmission using the bandwidth speed registered in the data-table 32 is completed. If the CPU judges that the all packets transmission is not completed, the process goes back to Step S4, and a next packet is transmitted after interposing a packet transmission interval time.

The CPU repeats Steps S4 to S7 until the all packets transmission completes. Accordingly, a packet transmission interval time is calculated through Steps S1a, S4 to S7, and S8 for each time after transmitting a packet.

As described above, a method using the data-table 32 identifies addressee information with a subnet-address of an IP address of addressee apparatuses connected to same one network. Therefore, a plurality of addressee apparatuses connected to same one network having a specific bandwidth speed can be grouped as one group. With such grouping method, a data-table can be readily prepared (i.e., information registration) compared to registering all IP addresses one by one, and can be readily maintained.

FIG. 9 shows another data-table 33 which registers addressee information in a different manner with respect to the data-tables 31 and 32. In the data-table 33, addressee information is neither identified by an IP address nor a subnet-address of each terminal apparatus, but identified by "alias information." The alias information of each terminal apparatus is non-IP address information. The alias information can be registered in the gatekeeper 7 or registered in the DNS server 8 as a host name, for example, wherein the gatekeeper 7 and the DNS server 8 is connected to the IP network and 1.

Typically, when a user wants to identify an addressee's terminal apparatus connected to the IP network, the user needs to know a specific IP address of the addressee's terminal apparatus in advance to input the specific IP address. However, the user may not be familiar to inputting the specific IP address, and may feel a burden of inputting such information. On the other hand, in case of a typical facsimile communication using a conventional public switched telephone network, the user designates an addressee with a telephone number (i.e., fax number). Therefore, the user is familiar to use a telephone number (i.e., fax number) to designate an addressee.

Accordingly, an addressee designation method using alias information is disclosed as an exemplary embodiment according to the present invention. The user may be familiar to another addressee designation method using MAC address, e-mail address, for example.

In view of above-described condition, a standardized system, which conforms to the ITU-T Recommendation H.323 version 2 and capable of multimedia communication on an IP network having a gatekeeper, has been publicly available. Specifically, it is assumed that a terminal apparatus such as a real-time networked facsimile conforming to the ITU-T Recommendation T.38 and H.323 is used in an environment having a gatekeeper on an IP network. Such terminal apparatus can communicate with the gatekeeper 7 using RAS (registration, admission and status) message.

As above described, the gatekeeper 7 on the IP network registers alias information such as fax number, MAC address, e-mail address by correlating the alias information and the IP addresses, and uses the registered alias information as key words to search IP addresses.

When the gatekeeper 7 receives alias information as addressee information, the gatekeeper 7 conducts an address conversion (i.e., conversion of alias information to a corresponding IP address), and also conducts an access control of network, for example.

As described above, the DNS server 8 has a data-table (not shown), in which IP addresses on the IP network 1 are correlated with domain names (e.g., host name). Therefore, an IP address can be identified by designating a host name. Under such arrangement, the data-table 33 in FIG. 9 uses telephone numbers (i.e., fax numbers) as alias information to identify addressee information, for example.

The facsimile 4 communicates (i.e., conducts packet transmission) with a predetermined addressee facsimile using the IP network and the data-table 33. In this case, the system controller 12 conducts a control operation, which is explained with a flow chart in FIG. 10.

As illustrated in FIG. 10, a facsimile communication starts with an input of alias information (e.g., fax number). In Step S1*b*, the CPU judges whether the input alias information matches with any alias information registered in the data-table 33. For example, the CPU judges that the input fax number does not exist in the data-table 33 because such fax number is not registered in the data-table 33. Then, in Step S2, packets are transmitted without any interruption during packet transmission.

In Step S3, the CPU judges whether the packet transmission completes. When the CPU judges that the all packets transmission completes, the CPU finishes the packets transmission. Specifically, packets are transmitted from the facsimile 4 to the facsimile 6 with a relatively fast speed having a bandwidth speed of 14.4 Kbps, for example.

On one hand, in Step S1*b*, if the input alias information (e.g., fax number) is "0351112222," for example, the CPU judges that the "0351112222" exists in the data-table 33 as alias information (e.g., fax number) because the "0351112222" is registered in the data-table 33. Then, in Step S4, a first packet is transmitted to the facsimile 5. In Step S5, the CPU reads out a bandwidth speed of 6.4 kbps, registered with the corresponding alias information in the data-table 33, and sets the bandwidth speed as "BANDWIDTH" (bps). In Step S6, the CPU determines a packet length of "PACKET_LEN" for one transmission.

Generally, it is better to transmit a longer packet per one transmission to conduct an efficient transmission because a longer packet reduces a number of headers. However, if one packet becomes significantly longer, it will affect other communications because such packet occupies a network with a longer time. Therefore, in this exemplary case, a user can choose a packet length by checking a crowded level on the network. For example, a user can select a packet length by operating selection buttons or the like of a facsimile apparatus.

In Step S7, the CPU computes a packet transmission interval time as below. The CPU computes "PACKET_LEN÷BANDWIDTH SPEED" to gain "allowable transmission time." Then, the CPU computes "allowable transmission time−actual transmission time" to determine a packet transmission interval time.

In Step S8, the CPU judges whether the all packets transmission using the bandwidth speed registered in the data-table 33 completes. If the CPU judges that the all packets transmission does not complete, the process goes back to Step S4, and a next packet is transmitted after interposing a packet transmission interval time.

The CPU repeats Steps S4 to S7 until the all packets transmission completes. Accordingly, a packet transmission interval time is calculated through Steps S1*b*, S4 to S7, and S8 for each time after transmitting a packet.

As described above, a method using the data-table 33 identifies addressee information with alias information such as telephone number, fax number, e-mail address, host name registered in an IP address resolution server such as the gatekeeper 7 and DNS server 8. With such method, a data-table can be readily prepared (i.e., information registration) compared to using IP addresses which are not user-friendly, and can be readily utilized for IP communication.

Although the above-described data-tables 32 and 33 do not register subnet-addresses and alias information of the facsimile 6, respectively, the data-tables 32 and 33 can also register subnet-addresses and alias information of the facsimile 6, respectively, by correlating them with bandwidth speeds of the facsimile 6, for example.

In such a case, Step S1*a* in FIG. 8 and Step S1*b* in FIG. 10 can be changed to a process that the CPU judges whether a bandwidth speed registered in the data-tables 32 or 33 can be used for packet transmission without any modification of the bandwidth speed.

In the above-discussion, the data-tables 31 to 33 register same kind of addressee information in each data-table. Specifically, the data-table 31 registers IP addresses with corresponding bandwidth speeds, the data-table 32 registers subnet-addresses with corresponding bandwidth speeds, and the data-table 33 registers alias information with corresponding bandwidth speeds. However, a data-table can register different kinds of addressee information as shown in another data-table 34 in FIG. 11.

The data-table 34 registers different kinds of addressee information such as IP address, telephone number. A character of "*(asterisk)" used in the addressee information in the data-table 34 is a wild card character that can indicate any number. Specifically, the data-table 34 shows an exemplary case that addressee information include subnet-addresses and telephone numbers (or fax numbers).

Figure 12:
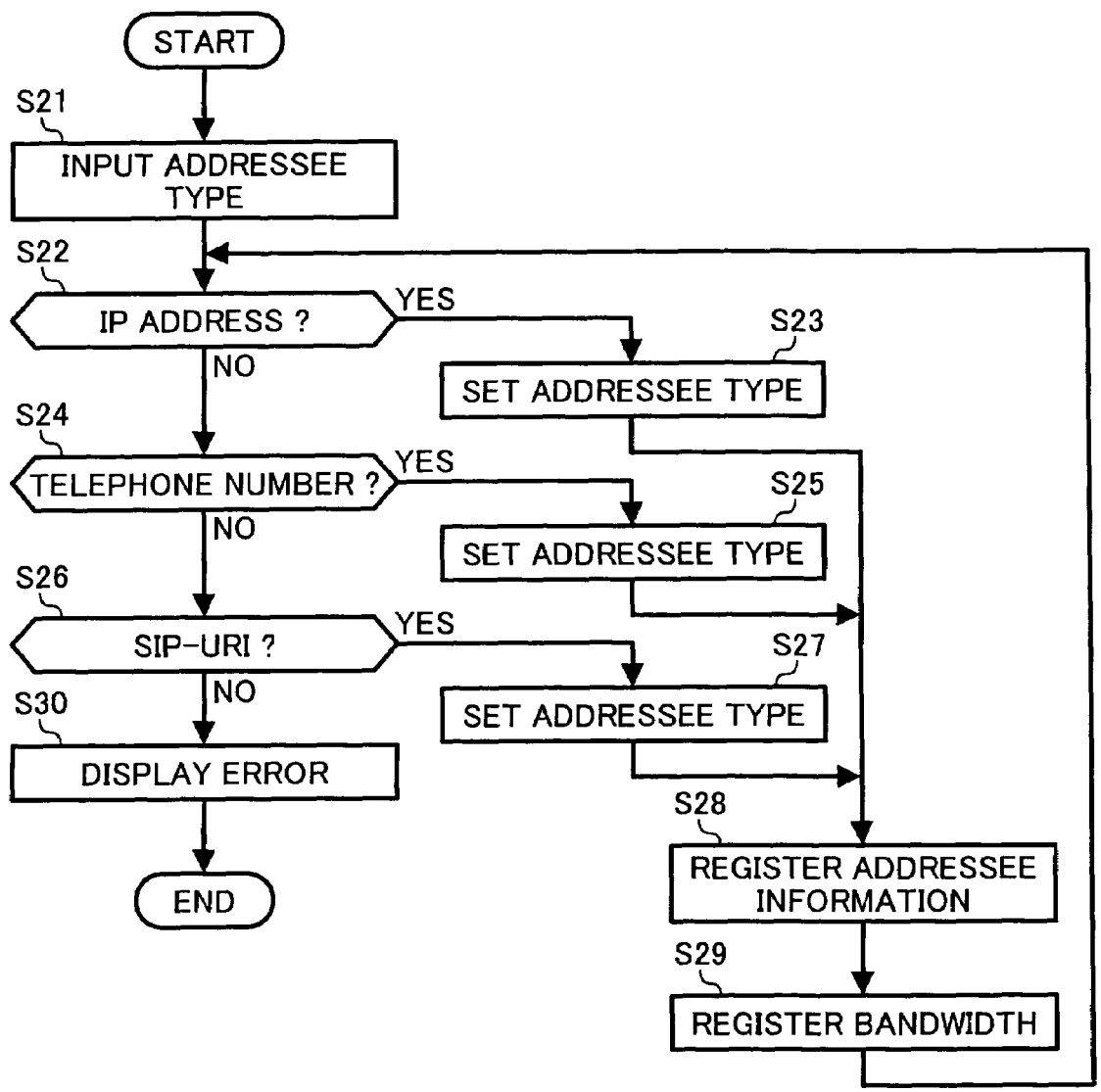
FIG. 12 is an exemplary flow chart explaining a data-table registration process according to an exemplary embodiment of the present invention.

An exemplary registration process for the data-table 34 is explained with a flow chart illustrated in FIG. 12. In Step S21, a type of addressee information is input. In Step S22, the CPU judges whether the type of addressee information is an IP address. If the CPU judges that the type of addressee information is an IP address, the IP address is set as a type of addressee information in Step S23. If the CPU judges that the type of addressee information is not an IP address in Step S23, the CPU judges whether the type of addressee information is a telephone number (or fax number) in Step S24.

If the CPU judges that the type of addressee information is a telephone number (or fax number), the telephone number (or fax number) is set as a type of addressee information in Step 25. If the CPU judges that the type of addressee information is not a telephone number (or fax number) in Step S24, the CPU judges whether the type of addressee information is a domain name (or host name) in Step S26. If the CPU judges that the type of addressee information is the domain name (or name), SIP-URI (session initiation protocol—uniform resource identifiers) is set as a type of addressee information in Step S27.

The SIP (session initiation protocol) is a signaling protocol on the application layer and used to establish, modify, and terminate a multimedia session on an IP network. It was proposed by a working group of the IETF (Internet Engineering Task Force) and becomes a protocol standard as RFC 3261. The URI (uniform resource identifiers) is information of addressees and used in the SIP. If the CPU judges that the type of addressee information is not the domain name (or host name), the CPU of the facsimile 4 processes such condition as an error, and displays an error message on a display unit of the facsimile 4, for example, in Step 30.

After Steps S23, S25, and S27, the CPU of the facsimile 4 registers addressee information in the data-table 34 in Step S28. In Step 29, the CPU registers bandwidth speeds corresponding to the input addressee information as bandwidth speeds that enable successful communication.

Figure 13:
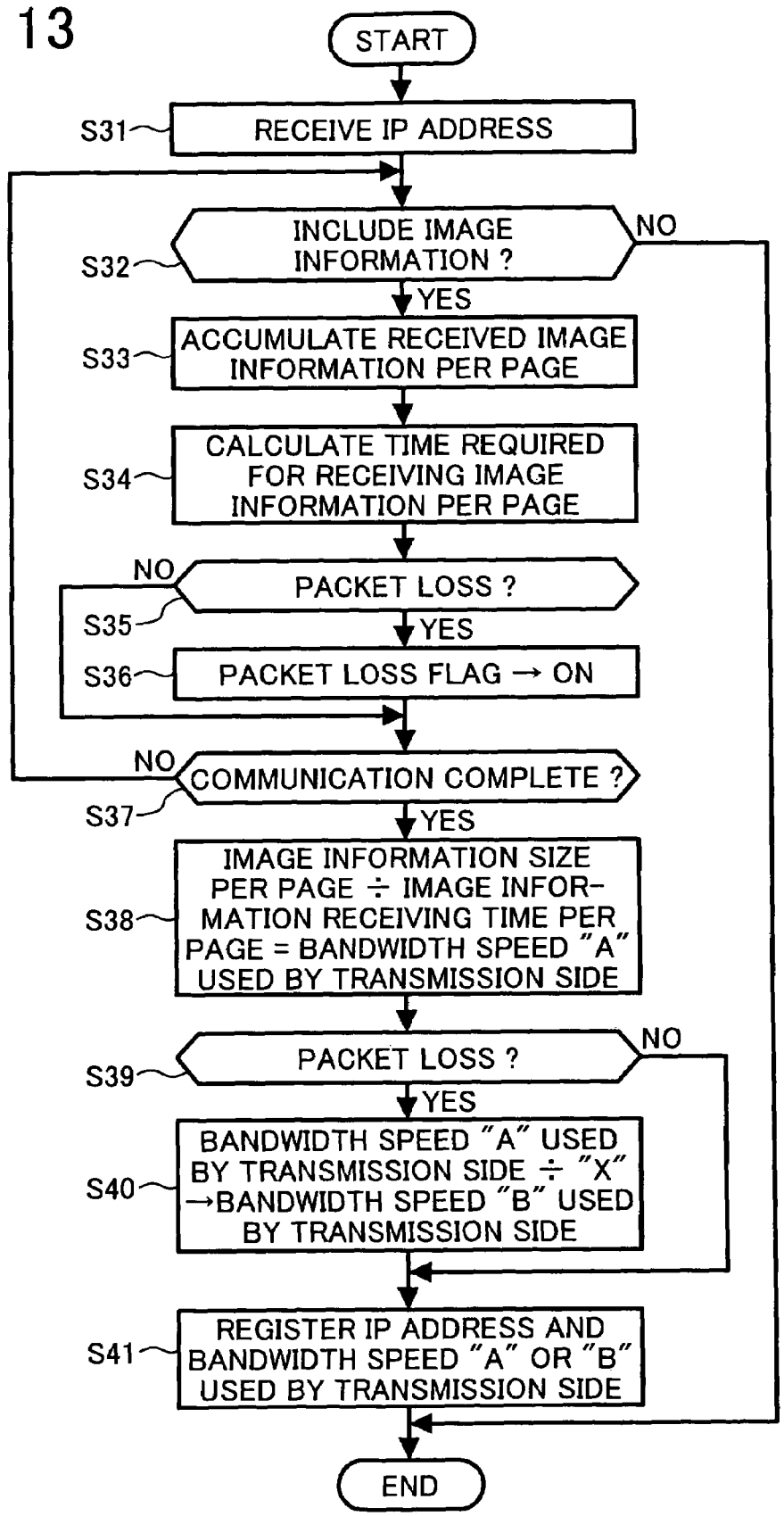
FIG. 13 is an exemplary flow chart explaining an automatic data-table registration process according to an exemplary embodiment of the present invention.

Referring now to FIG. 13, an exemplary flow chart for an automatic registration for the data-table 31 is explained. Hereinafter, assume that two terminal apparatus V (not shown) and terminal apparatus W (not shown) communicate packets via an IP network, wherein the terminal apparatus V is used as a receiving side apparatus and the terminal apparatus W is used as a transmitting side apparatus.

The terminal apparatus V obtains a packet-receiving history including a packet transmission error history during packet communication with the terminal apparatus W. After the start of packet communication, the terminal apparatus V obtains IP address of the terminal apparatus W. Then, the terminal apparatus V receives packets from the terminal apparatus W. During such packet communication, a bandwidth speed enabling packet transmission from the terminal apparatus W to the terminal apparatus V is calculated.

Based on such calculation, a CPU of the terminal apparatus V registers above-mentioned IP address and corresponding transmission enabling bandwidth speed in the data-table 31 in an automatic manner. The terminal apparatus V utilizes such information stored in the data-table 31 when the terminal apparatus V is used as a transmitting side apparatus.

In Step S31, when the terminal apparatus V (not shown) receives information from the terminal apparatus W (not shown) through an IP network, the terminal apparatus V obtains IP address of the terminal apparatus W.

In Step S32, the CPU of terminal apparatus V judges whether a transmission from the terminal apparatus W includes image information. The image information is generated by scanning a document, for example. If the CPU judges that the transmission does not include the image information but includes non-image information such as transmission by IP telephone, the process gores to "End."

If the CPU judges that the transmission includes the image information such as facsimile-image information, the CPU accumulates a data size of the facsimile-image information per page, and also accumulates a time required for receiving the facsimile-image information per page in Step S34. The CPU conducts such calculations for each transmitted page, for example.

In Step S35, the CPU judges whether a packet loss happens during packet transmission. If the CPU judges that a packet loss happens, a packet loss flag is set to "ON" in Step S36. In Step S37, the CPU judges whether all packets communication completes. If the CPU judges that all packets transmission does not complete, the process goes back to Step S32. The CPU repeats the above-mentioned Steps S32 to S37 until all packets transmission completes.

After the completion of the all packets transmission, based on the above-mentioned calculated result of the data size and the time of the facsimile-image information, the CPU divides the "image information size per page" with the "image information receiving time per page" in Step S38 to determine a bandwidth speed "A" used by the terminal apparatus W.

In Step S39, the CPU judges whether a packet loss happens by checking "ON/OFF" status of a packet loss flag. If the CPU judges that no packet loss happens (i.e., no packet-receiving error), the bandwidth speed "A" calculated in Step S38 is registered as the bandwidth speed for the terminal apparatus W in Step S41.

If the CPU judges that a packet loss happens (i.e., a packet-receiving error happens), the CPU judges that the bandwidth speed "A" used by the terminal apparatus W is too fast for the IP network coupling the terminal apparatus V and the terminal apparatus W.

Then, in Step S40, the CPU divides the bandwidth speed "A" by a number of "x" to obtain another bandwidth speed "B", wherein the "x" can take any number such as two, three, and so forth.

In Step S41, the CPU correlates the bandwidth speed "B" to the IP address of the terminal apparatus W and registers the bandwidth speed "B" in the data-table 31. Accordingly, the CPU registers a bandwidth speed in two ways in Step S41.

When the CPU judges that that no packet loss happens in Step S39, the bandwidth speed "A" calculated in Step S38 is registered in the data-table 31 as the bandwidth speed for communication with the terminal apparatus W.

On the other hand, when the CPU judges that a packet loss happens in Step S39, the bandwidth speed "B" obtained by dividing the bandwidth speed "A" with "x," wherein the "x" can take any number such as two, three, and so forth, is registered in the data-table 31 as the bandwidth speed for communication with the terminal apparatus W.

The above described registration method can automatically register the IP address and corresponding bandwidth speeds in the data-table 31 based on a packet-receiving history, therefore, the data-table 31 can be readily prepared.

The above-described communication method can be conducted with the computer of the communication apparatus according to an exemplary embodiment of the present invention by executing a program for such communication method.

The communication apparatus according to an exemplary embodiment of the present invention can store such program in the communication apparatus, or can download such program via a network.

The invention may be conveniently implemented using a conventional general purpose digital computer programmed according to the teaching of the present specification, as will be apparent to those skilled in art in the computer art. Appropriate software coding can readily be prepared by skilled programmers based on the teaching of the present disclosure, as will be apparent to those skilled in art in the software art. The present invention may also be implemented by the preparation of the application specific integrated circuits or by interconnecting an appropriate network of conventional component circuits, as will be apparent to those skilled in the art.

Numerous additional modifications and variations are possible in light of the above teachings. It is therefore to be understood that within the scope of the appended claims, the disclosure of the present invention may be practiced otherwise than as specifically described herein.

This application claims priority from Japanese patent applications No. 2004-076031 filed on Mar. 17, 2004 in the Japan Patent Office, the entire contents of which are hereby incorporated by reference herein.

What is claimed is:

1. A communication apparatus connected to a plurality of IP (internet protocol) networks that are connected with other communication apparatuses through the plurality of IP networks, the communication apparatus comprising:
   a memory configured to store addressee information of the other communication apparatuses; and
   a controller configured to conduct packet communications between the communication apparatus and the other communication apparatuses through the plurality of IP networks and to control bandwidth speeds used for the packet communication with the other communication apparatuses through the plurality of IP networks according to the addressee information of the other communication apparatuses stored in the memory, wherein
   the bandwidth speeds are used to determine packet lengths and packet transmission intervals, and the memory includes a data-table configured to register the addressee information and corresponding bandwidth speeds of the other communication apparatuses such that the addressee information and the bandwidth speeds of the other communication apparatuses are correlated with each other.

2. The communication apparatus according to claim 1, wherein the controller is configured to control the bandwidth speeds by referring to addressee information in the data-table.

3. The communication apparatus according to claim 1, wherein the data-table is configured to register at least the addressee information and corresponding bandwidth speeds of the other communication apparatuses connected to the plurality of IP networks having relatively slower bandwidth speeds.

4. The communication apparatus according to claim 1, wherein the controller of the communication apparatus is further configured to obtain the IP addresses of the other communication apparatuses, to calculate bandwidth speeds enabling the packet communication between the communication apparatus and the other communication apparatuses, and to register the IP addresses and the calculated bandwidth speeds to the data-table of the memory of the communication apparatus such that the IP addresses and the calculated bandwidth speeds of the other communication apparatuses are correlated with each other.

5. The communication apparatus according to claim 4, wherein the controller of the communication apparatus is configured to use the calculated bandwidth speed stored in the data-table of the memory of the communication apparatus when the communication apparatus conducts the packet transmission to the other communication apparatuses.

6. The communication apparatus according to claim 1, wherein the addressee information of the other communication apparatuses include IP addresses of the other communication apparatuses.

7. The communication apparatus according to claim 1, wherein the addressee information of the other communication apparatuses include subnet-addresses of the IP addresses of the other communication apparatuses.

8. The communication apparatus according to claim 1, wherein the addressee information of the other communication apparatuses include alias information registered in a network facility connected to the plurality of IP networks and configured to resolve the IP addresses of the other communication apparatuses.

9. The communication apparatus according to claim 1, wherein the controller of the communication apparatus is further configured
to add packet length of each packet transmitted from the communication apparatus from a start of the packet transmission,
to divide the added packet length with the bandwidth speeds registered in the data-table of the communication apparatus as the bandwidth speeds for the corresponding other communication apparatuses to obtain an allowable transmission time for one packet transmission,
to compare the allowable transmission time and an actual transmission time of one packet transmission, and
to conduct the packet transmission by adjusting a packet transmission interval based on a result of a comparison of the allowable transmission time and the actual transmission time when a bandwidth speed is changed.

10. A communication method for conducting packet communication between a first communication apparatus and other communication apparatuses, the first communication apparatus and the other communication apparatuses being connected to communicate via a plurality of IP (internet protocol) networks, comprising the steps of:
inputting addressee information of the other communication apparatuses;
requesting the input addressee information of the other communication apparatuses;
setting bandwidth speed according to bandwidth speeds registered in correspondence with IP addresses as the addressee information of the other communication apparatuses;
transmitting a packet;
reading the bandwidth speeds registered corresponding to the addressee information of the other communication apparatuses;
selecting a packet length for the packet transmission;
determining a packet transmission interval between one packet transmission and next packet transmission; and
confirming a completion of the packet transmission.

11. The communication method according to claim 10, wherein
said step of inputting comprises storing said addressee information into a memory;
said method further comprising:
controlling said steps of requesting, transmitting, reading, selecting and determining with a controller configured to conduct the packet communication with the other communication apparatuses, said step of controlling including controlling control bandwidth speeds used by the packet communication with other communication apparatuses according to the addressee information of the other communication apparatuses stored in the memory.

12. The communication method according to claim 11, wherein said step of storing comprises:
registering a data-table in said memory, said data-table including the addressee information and corresponding bandwidth speeds of the other communication apparatuses such that the addressee information and the bandwidth speeds of the other communication apparatuses are correlated with each other.

13. The communication method according to claim 12, wherein said step of controlling comprises:
referring to the data-table by using the addressee information of the other communication apparatuses.

14. The communication method according to claim 12, wherein said step of registering comprises:
registering at least the addressee information and corresponding bandwidth speeds of the other communication apparatuses connected to the plurality of IP networks having relatively slower bandwidth speeds.

15. The communication method according to claim 12, wherein the addressee information of the other communication apparatuses includes IP addresses of the other communication apparatuses.

16. The communication method according to claim 12, wherein the addressee information of the other communication apparatuses includes subnet-addresses of the IP addresses of the other communication apparatuses.

17. The communication method according to claim 12, wherein the addressee information of the other communication apparatuses includes alias information registered in a network facility connected to the plurality of IP networks and configured to resolve the IP addresses of the other communication apparatuses.

18. The communication method according to claim 12, wherein said step of controlling further comprises:

obtaining the IP addresses of the other communication apparatuses;

calculating bandwidth speeds enabling the packet communication between the communication apparatus and the other communication apparatuses; and registering the IP addresses and the calculated bandwidth speeds to the data-table in said memory of the communication apparatus such that the IP addresses and the calculated bandwidth speeds of the other communication apparatuses are correlated with each other.

19. The communication method according to claim 18, wherein said step of controlling further comprises:

using the calculated bandwidth speed stored in the data-table in said memory of the communication apparatus when the communication apparatus conducts the packet transmission to the other communication apparatuses.

20. The communication method according to claim 11, wherein said step of controlling further comprises:

adding packet length of each packet transmitted from the communication apparatus from a start of the packet transmission;

dividing the added packet length with the bandwidth speeds registered in the data-table of the communication apparatus as the bandwidth speeds for the corresponding other communication apparatuses to obtain an allowable transmission time for one packet transmission;

comparing the allowable transmission time and an actual transmission time of one packet transmission; and adjusting a packet transmission interval based on a result of a comparison of the allowable transmission time and the actual transmission time when a bandwidth speed is changed.

21. A computer-readable medium configured to store a communication program comprising computer-readable instructions that, when executed by a computer of a first communication apparatus, instructs the first communication apparatus to carry out a method of packet communication with other communication apparatuses via a plurality of IP (internet protocol) networks connecting the first communication apparatus to the other communication apparatuses, the computer-readable instructions comprising the steps of:

inputting addressee information of the other communication apparatuses;

requesting the input addressee information of the other communication apparatuses;

setting bandwidth speed according to bandwidth speeds registered in correspondence with IP addresses as the addressee information of the other communication apparatuses;

transmitting a packet;

reading the bandwidth speeds registered corresponding to the addressee information of the other communication apparatuses;

selecting a packet length for the packet transmission;

determining a packet transmission interval between one packet transmission and next packet transmission; and confirming a completion of the packet transmission, wherein the computer-readable medium is provide in the communication apparatus.

22. A computer-readable medium storing a communication program comprising computer-readable instructions that, when executed by a computer of a first communication apparatus, instructs the first communication apparatus to carry out a method of communication with other communication apparatuses via a plurality of IP (internet protocol) networks connecting the first communication apparatus to the other communication apparatuses, the computer-readable instructions comprising the steps of:

inputting addressee information of the other communication apparatuses;

requesting the input addressee information of the other communication apparatuses;

transmitting a packet;

setting bandwidth speed according to bandwidth speeds registered in correspondence with IP addresses as addressee information of the other communication apparatuses;

reading bandwidth speeds corresponding to the addressee information of the other communication apparatuses;

selecting a packet length for the packet transmission;

determining a packet transmission interval between one packet transmission and next packet transmission; and confirming a completion of the packet transmission.

23. The communication method according to claim 22, wherein said step of inputting comprises storing said addressee information into a memory;

said method further comprising:

controlling said steps of requesting, transmitting, reading, selecting and determining with a controller configured to conduct the packet communication with the other communication apparatuses, said step of controlling including controlling control bandwidth speeds used by the packet communication with other communication apparatuses according to the addressee information of the other communication apparatuses stored in the memory.

24. A communication system using a plurality of IP (internet protocol) networks for packet communication, comprising:

a plurality of communication apparatuses communicating with each other through at least one of the plurality of IP networks, each of the communication apparatuses comprises a memory configured to store addressee information of the other communication apparatuses, the memory including a data table configured to register the addressee information and corresponding bandwidth speeds of the other communication apparatuses such that the addressee information and the bandwidth speeds of the other communication apparatuses are correlated with each other; and a controller configured to conduct the packet communication with the plurality of communication apparatuses and to control bandwidth speeds used by the packet communication with other communication apparatuses according to the addressee information of the plurality of communication apparatuses and corresponding bandwidth speed stored in the memory, wherein the bandwidth speeds are used to determine packet lengths and packet transmission intervals; and at least one network facility configured to be used for the packet transmission.

* * * * *